United States Patent [19]

Okamoto et al.

[11] Patent Number: 4,599,479
[45] Date of Patent: * Jul. 8, 1986

[54] THERMAL CRACKING PROCESS FOR PRODUCING OLEFINS FROM HYDROCARBONS

[75] Inventors: Toshiro Okamoto, Tokyo; Michio Ohshima, Hiroshima, both of Japan

[73] Assignee: Mitsubishi Jukogyo Kabushiki Kaisha, Tokyo, Japan

[*] Notice: The portion of the term of this patent subsequent to Jul. 2, 2002 has been disclaimed.

[21] Appl. No.: 705,974

[22] Filed: Feb. 27, 1985

Related U.S. Application Data

[63] Continuation of Ser. No. 583,939, Feb. 27, 1984, Pat. No. 4,527,003.

[30] Foreign Application Priority Data

Mar. 3, 1983 [JP] Japan .................................. 58-34928

[51] Int. Cl.$^4$ ................................................ C07C 4/04
[52] U.S. Cl. .................................. 585/648; 585/652; 208/107; 208/129; 208/130
[58] Field of Search ............... 208/130, 129, 128, 107; 585/648, 652

[56] References Cited

U.S. PATENT DOCUMENTS

| | | | |
|---|---|---|---|
| 4,136,015 | 1/1979 | Kamm et al. | 585/652 |
| 4,259,177 | 3/1981 | Ueda et al. | 585/648 |
| 4,264,435 | 4/1981 | Read, Jr. et al. | 208/130 |
| 4,271,008 | 6/1981 | Vogt et al. | 208/129 |
| 4,321,131 | 3/1982 | Lowe | 208/130 |

Primary Examiner—Andrew H. Metz
Assistant Examiner—Anthony McFarlane
Attorney, Agent, or Firm—Toren, McGeady, Stanger, Goldberg & Kiel

[57] ABSTRACT

A thermal cracking process for producing olefins from hydrocarbons which comprises the steps of burning hydrocarbons with less than the theoretical amount of oxygen in the presence of steam to give a hot gas of from 1400° to 300° C. comprising steam and hydrogen prior to reaction; feeding to the hot gas comprising the steam and hydrogen, a mixture of methane and hydrogen so that a methane/hydrogen molar ratio in said hot gas is over 0.05; further feeding a starting hydrocarbon to the hot gas mixture comprising the methane, hydrogen and steam; subjecting the starting hydrocarbon to thermal cracking while keeping the partial pressure of hydrogen at least 0.1 bar at the outlet of a reactor, the temperature at 800° to 1200° C., and the residence time at 5 to 300 milliseconds; and quenching the resulting reaction product.

6 Claims, 6 Drawing Figures

THERMAL CRACKING PROCESS FOR PRODUCING OLEFINS FROM HYDROCARBONS

This is a continuation of application Ser. No. 583,939, filed Feb. 27, 1984 and now U.S. Pat. No. 4,527,003.

This invention relates to a process for producing olefins by a thermal cracking of hydrocarbons. More particularly, it relates to a process for producing olefins from hydrocarbons which comprises the steps of burning hydrocarbons with less than the theoretical amount of oxygen in the presence of steam to generate a hot gas comprising steam and hydrogen whereby the hot gas is used as a heat source and also as make-up hydrogen for thermal cracking reaction, feeding a mixture of methane and hydrogen necessary for the reaction to the hot gas comprising the steam and hydrogen, and thermally cracking a hydrocarbon in coexistence of predetermined amounts of the methane, hydrogen and steam.

The tube-type thermal cracking process called steam cracking is well known and has heretofore been used to convert, into olefins, light gaseous hydrocarbons such as ethane and propane as well as liquid hydrocarbons such as naphtha and kerosine. According to this process, heat is supplied from outside through tube walls, thus placing limits on the heat transmission speed and the reaction temperature. Ordinary conditions adopted for the process include a temperature below 850° C., a residence time of from 0.1 to 0.5 second and atmospheric pressure. In view of these limitations imposed on the apparatus and the reaction conditions, the process may be applied only to gas oil and are not applicable to heavy oils such as residual oils. This is because high temperature and long-term reactions involve undesirable side reactions such as polycondensation and thus coking takes place, with a desired level of gasification being not achieved. Several alternative processes have been proposed in which hydrogen or hydrocarbons are completely burnt with oxygen to generate a hot gas and the hot gas is used, as a heat source, to thermally crack starting hydrocarbons therewith.

In one such process, methane and hydrogen obtained by thermal cracking are completely burnt with oxygen to generate a hot gas. The hot gas is mixed with steam to give a reaction atmosphere which is as high as 800° to 1600° C., followed by thermally cracking a starting hydrocarbon under a pressure as low as atmospheric pressure at a residence time of from 10 to 60 milliseconds, thereby producing olefins. In this process, however, the starting hydrocarbon is limited to light hydrocarbon fractions including gas oil. Application to heavy hydrocarbons cannot be expected because of the low rate of gasification and considerable coking.

Another process comprises the steps of providing liquid hydrocarbons such as crude petroleum as a fuel, completely burning the hydrocarbons with oxygen to give a hot gas, and thermally cracking a hydrocarbon under conditions of a pressure of from 5 to 70 bars, a reaction temperature of from 1315° to 1375° C. and a residence time of from 3 to 10 milliseconds. In this process, an inert gas such as $CO_2$, $N_2$ or the like is fed in the form of a film from the burner for the hot gas toward the reactor to suppress occurrence of coking. By this, thermal cracking of heavy hydrocarbons such as residual oil is made possible. Although this process makes it possible to prevent deposition of starting oil on walls or suppress coking caused by polymerization of the generated cracked gases on the wall surfaces, coking of starting oils themselves by polycondensation thereof, or polymerization or sooting of cracked gases is not avoided. Hence, an increase in yield of valuable gases cannot be expected. To suppress the coking, the feed of the inert gas in substantial amounts is needed, with the attendant disadvantage that an increased burden is imposed on a purification and recovery system for cracked gases and the thermal economy of the process is lowered.

A further process comprises partially burning hydrogen to give hot hydrogen gas and thermally cracking various hydrocarbons including heavy hydrocarbons in an atmosphere of the hot hydrogen gas under conditions of a reaction temperature of from 800° to 1800° C. and a pressure of from 7 to 70 bars thereby obtaining olefins. The use of the hydrogen atmosphere enables one to effect the rapid heating and the super-short-term thermal cracking, leading to suppression of coking. This is why the cracking of heavy hydrocarbons is possible. However, this process is disadvantageous in that because a large amount of hydrogen is used, once produced valuable olefins are converted into less valuable methane by hydrogenation with the hydrogen. The formation of methane by the hydrogenation reaction involves generation of heat in a substantial degree and the reaction temperature rises. As a result, there is the tendency toward a runaway reaction where the hydrogenation reaction is more promoted and methane is more easily generated. This results in a sharp reduction in amount of ethylene with methane being formed. Thus, it is difficult to maintain the yield of olefins at a high level. A more serious problem is that the production of methane involves a consumption of valuable hydrogen. In other words, valuable hydrogen is used to convert once formed valuable ethylene and the like into less valuable methane, and this causes a great economic loss.

We have already found and proposed a process in which the thermal cracking is effected in an atmosphere of methane, hydrogen and steam to attain selective formation of olefins in a higher yield as compared with prior art processes. In the process, methanization of olefins with hydrogen is suitably suppressed without impeding the advantage due to the presence of hydrogen.

We have made further and intensive studies to develop a thermal cracking process of producing olefins from a wide variety of hydrocarbons including light and heavy hydrocarbons to selectively obtain desired types of olefins in high yields. As a result, it has been found that thermal cracking of hydrocarbons effectively proceeds in an atmosphere which is obtained by burning a hydrocarbon with less than the theoretical amount of oxygen in the presence of steam to obtain a hot gas comprising generated hydrogen and steam and feeding a predetermined amount of a mixture of methane and hydrogen to the hot gas. By the thermal cracking, desired olefins or BTX (benzene, toluene and xylene) are obtained in high yields from heavy hydrocarbons without involving coking. Moreover, olefins and BTX are obtained from gas oils such as naphtha in much higher yields than in the case of prior art processes. The present invention is accomplished based on this finding.

It is accordingly an object of the present invention to provide a thermal cracking process for producing olefins from hydrocarbons which overcomes the drawbacks of the prior art processes.

It is another object of the invention to provide a process of thermally cracking hydrocarbons in which light and heavy hydrocarbons are converted into valuable olefins while suppressing methanation of once generated olefins.

It is a further object of the invention to provide a process of thermally cracking hydrocarbons by which desired olefins are selectively obtained in very high yields.

The above objects can be achieved, according to the invention, by a thermal cracking process for producing olefins from hydrocarbons which comprises the steps of burning hydrocarbons with less than the theoretical amount of oxygen in the presence of steam to give a hot gas of from 1400° to 3000° C. comprising steam and hydrogen prior to reaction; feeding to the hot gas comprising steam and hydrogen a mixture of methane and hydrogen so that a methane/hydrogen molar ratio is not less than 0.05; further feeding a starting hydrocarbon to the hot gas mixture comprising the methane, hydrogen and steam; subjecting the starting hydrocarbon to thermal cracking while keeping the partial pressure of hydrogen at not less than 0.1 bar at the outlet of a reactor, the temperature at 800° to 1200° C., and the residence time at 5 to 300 milliseconds; and quenching the resulting reaction product.

In the practice of the invention, heat energy necessary for the thermal cracking reaction is supplied in the form of a hot gas comprising hydrogen and steam which is obtained by partially burning a hydrocarbon with oxygen in the presence of steam. The energy is obtained by internal combustion of the hydrocarbon, so that such a high temperature as will not be attained by external heating can be easily obtained with the heat generated being utilized without a loss. The heating by the internal combustion of hydrocarbons has been heretofore proposed. In general, gaseous hydrocarbons and clean oils such as kerosine are mainly used for this purpose and a complete combustion system is adopted. Use of heavy oils has also been proposed. However, burning of such oils will cause coking and sooting, which requires circulation of an inert gas such as $CO_2$, $N_2$ or the like in large amounts as described before.

In the thermal cracking process of the invention, a hydrocarbon is first burnt in the presence of steam, including steam necessary for a subsequent reaction section, in amounts of 1 to 20 times as large as that of the fuel hydrocarbon on the weight basis, with oxygen in amounts less than the theoretical in order to keep hydrogen in an amount sufficient for a chemical consumption in the subsequent reaction section. Upon the burning, coking and sooting can be suitably suppressed by properly controlling the burning conditions and also by the gasification reaction of solid carbon with steam and carbon dioxide. A prominent feature of the present invention resides in that the consumption of hydrogen due to the outflow of unreacted oxygen toward a subsequent section or a loss of effective components is prevented; and burning conditions in a combustor through which hydrogen consumed by the reaction is intentionally supplemented are properly selected. The steam contained in the atmosphere is readily condensed, different from $CO_2$, $N_2$ and other gases, in a separation and purification process of the cracked gas and is thus recovered, with an advantage that little or no burden on the purification system increases.

The process of the invention is described in more detail.

Hydrogen contained in the atmosphere of the reaction has the following advantages. Firstly, hydrogen has a much higher thermal conductivity than other substances. As a result, even heavy hydrocarbons can be quickly heated to raise temperatures thereof. Especially, when heavy hydrocarbons are used as starting materials, the residence time in the liquid state can be so shortened that the polycondensation reaction which is a liquid phase reaction can be suppressed, leading to a high gasification rate. Secondly, not only the polycondensation reaction in the liquid phase can be suppressed by hydrogenation as described above, but also when heavy hydrocarbons are used as a starting material, supplement of hydrogen from outside which is insufficient relative to the carbon content results in an increase in amount of light gases. With regard to the production of coke from the gas phase, an amount of acetylene which may be a precursor for the reaction can be reduced. Thirdly, hydrogen serves to increase a radical concentration in the reaction system and thus high cracking and gasification speeds can be achieved. This effect is more pronounced under high temperature and high pressure conditions as used in the present invention. However, the use of hydrogen has also disadvantages which should not be overlooked. Because of the presence of hydrogen, olefins are consumed particularly under pressure with the tendency toward formation of saturated products. This is nothing but the most serious problem involved in prior art thermal cracking processes using hydrogen atmosphere. In an atmosphere consisting of hydrogen alone, propylene and ethylene produced by thermal cracking of starting hydrocarbons hydrogenated according to the following reactions (1) through (3)

$$C_3H_6 + H_2 \rightarrow C_2H_4 + CH_4 \tag{1}$$

$$C_2H_4 + H_2 \rightarrow C_2H_6 \tag{2}$$

$$C_2H_6 + H_2 \rightarrow 2CH_4 \tag{3}$$

Consequently, methane and ethane increase in amounts and particularly a considerable increase in amount of methane is not avoidable. In this connection, however, all the propylene and ethylene do not disappear. This is because the formation reaction speeds of these olefins are higher than the reactions (1) through (3). Even though the reaction system is quenched for reaction freezing, the olefins are lost during a very short cooling time according to the reactions (1) through (3).

In the practice of the invention, not only hydrogen, but also methane is added to the atmosphere prior to commencement of the reaction. This is one of prominent features of the invention by which hydrogenation which is the most serious problem involved in the use of hydrogen is suppressed without impeding the advantages caused by the presence of hydrogen. If a large amount of methane is added to the atmosphere for the reaction, the conversion reactions (4), (5) and (6) of methane into ethane, ethylene and the like proceed simultaneously with the reactions (1) through (3)

$$2CH_4 \rightarrow C_2H_6 + H_2 \quad (4)$$

$$C_2H_6 \rightarrow C_2H_4 + H_2 \quad (5)$$

$$C_2H_4 + CH_4 \rightarrow C_3H_8 \rightarrow C_3H_6 + H_2 \quad (6)$$

By this, the conversion into methane by hydrogenation can be offset or suppressed. Moreover, proper control of the reaction temperature, pressure and methane/hydrogen ratio in the atmosphere promotes decomposition of methane. Thus, the added methane can be converted to more valuable ethylene, ethane and acetylene. For instance, when the reactions (4) and (5) for producing ethylene from methane are assumed to be elementary reactions, the following reaction takes place. Under high temperature conditions, highly active methyl radicals ($CH_3 \cdot$) are produced from methane. The methyl radicals are re-combined to give ethane. The withdrawal reaction for hydrogen molecule or radical ($H \cdot$) takes place and ethane is converted directly or via ethyl radical ($C_2H_5 \cdot$) into ethylene. This is represented by the following reaction formula The formation reaction of the methyl radical proceeds as follows in coexistence of hydrogen and methane

$$CH_4 + H \cdot \rightarrow CH_3 \cdot + H_2$$

Accordingly, if methane is present in large amounts, the concentration of the hydrogen radical is reduced with an increased concentration of the methyl radical. That is, methane serves as an absorbent for the hydrogen radical and thus prevents the hydrogenation reaction of olefins with the hydrogen radical. In addition, it has the ability to promote the dehydrogenation reaction and simultaneously convert the methane, which may be formed by recombination of the produced methyl radicals, into ethane and ethylene. Methane does not serve as a diluent but contributes to an increased yield of ethylene and the like in view of the reaction mechanism as discussed hereinabove. The atmosphere comprising methane and hydrogen used in the present invention shows significant differences in performance and effect over prior art hydrogen atmospheres which are diluted merely with steam, an inert gas or the like. In addition, the effect of the addition of methane is shown with the advantages of hydrogen being rarely reduced.

The steam fed to the combustion section serves to suppress coking in the reaction section according to the following water gas reaction $$C + H_2O \rightarrow CO + H_2 \text{ or}$$

$$C + CO_2 \rightarrow 2CO$$

Thus, valuable hydrogen can be recovered from heavy coking substances. Hydrogen can be also obtained by the shift reaction using CO. As a result, a reduction in amount of hydrogen necessary for the reaction atmosphere becomes possible, and the reaction atmosphere is thus so mild that hydrogenation of higher olefins such as propylene, butadiene and the like are suitably prevented by the co-action with methane. The yield of propylene and butadiene increases with a reduced consumption of hydrogen.

The hydrogen necessary for the reaction of the present invention is fed to a reactor by combining recycle hydrogen from the product separation and purification system with make-up hydrogen in an amount corresponding to a chemical consumption thereof during the reaction. In prior art practice, make-up hydrogen is obtained by generating a hot or high temperature reformed gas (crude synthetic gas) mainly composed of hydrogen and carbon monoxide by a separate steam reforming of methane and the like, and subjecting the crude synthetic gas to cooling, shift reaction, and separation, purification and re-heating of hydrogen while consuming large quantities of heat and separation energy.

In contrast, in the thermal cracking process of the invention, an arbitrary hydrocarbon fuel comprising a heavy hydrocarbon such as asphalt is partially oxidized with less than the theoretical amount of oxygen in the presence of steam in a combustor located upstream of the reactor. By the oxidation, hydrogen (including hydrogen from the shift reaction of CO as will be described hereinafter) in an amount required for the make-up hydrogen is generated. The thus generated hot hydrogen gas comprising CO, $CO_2$, $H_2O$ and the like is utilized as the make-up hydrogen without any separation and purification. The thermal cracking process of the invention does not need any cooling, separating, purifying and heating procedures for the generation of hydrogen as in the case of the above-described steam reformer. Moreover, the thermal energy of the hot gas can be used for the endothermic thermal cracking reaction in the subsequent step. In this manner, the hydrogen for the reaction can be fed to the reactor simply and in high heat efficiency. On the other hand, the CO generated by the partial oxidation does not cause any harmful reaction in the reactor but serves as a heat transfer medium. In the subsequent step, the CO is used to generate hydrogen according to the shift reaction and the hydrogen is recycled to the reaction as a part of the make-up hydrogen. It should be noted that the amount of the make-up hydrogen is usually varied depending on the atomic H/C ratio of a starting hydrocarbon used. In some cases, little or no make-up hydrogen may be used. The make-up amount may be readily controlled by varying the amount of oxygen relative to the fuel.

On the other hand, methane is essentially required in a predetermined ratio to the hydrogen for the reaction in the thermal cracking process of the invention. For this purpose, methane which is obtained from the product separation and purification system, say, the top of a demethanizer in the form of a mixture with recycle hydrogen or methane alone is recycled and fed to a portion located downstream of the combustor but upstream of the reactor. The methane necessary for the reaction is fundamentally self-supplied in an amount equal to that of the methane obtained by the thermal cracking reaction. To this end, thermal cracking conditions are properly controlled. One of prominent features of the thermal cracking process of the invention resides in that different from prior art processes, the yield of methane can be arbitrarily controlled to be at a desired level by a proper combination of the methane/hydrogen ratio and the severity of cracking conditions. This is attributable to such a mechanism that methane is easily converted into useful components in the presence of hydrogen depending on operating conditions. For instance, in order that the yield of methane is caused to be zero and useful components such as olefins are increased so much, it is sufficient to raise the methane/hydrogen ratio and shorten the cracking time. Because methane is relatively easily convertible to valuable components, it may be rather preferable to use, as a fuel for feeding internal reaction heat to the reactor, hydrocarbons of rather poor quality such as asphalt or non-cracked residues. In case where the yield of methane is higher than as required for the reaction, yields of useful components lower, so that all the generated methane should be recycled for the reaction. In this case, the methane/hydrogen ratio usually increases and the reaction system is so autonomously controlled toward the direction that the yield of methane is reduced for the reason described before. In this way, hydrogen and methane in the atmosphere of the reaction system are fundamentally circulated and used for the reaction and are not used as a fuel. On the other hand, hydrogen and methane from the product separation and purification system are subjected to recovery of all recoverable cold heat, after which it is generally added directly to a hot gas comprising steam and heated without preheating in order to avoid heat and apparatus losses.

BRIEF DESCRIPTION OF THE DRAWINGS

A preferred embodiment of the present invention will be explained in detail with reference to the accompanying diagrams.

Figure 1:
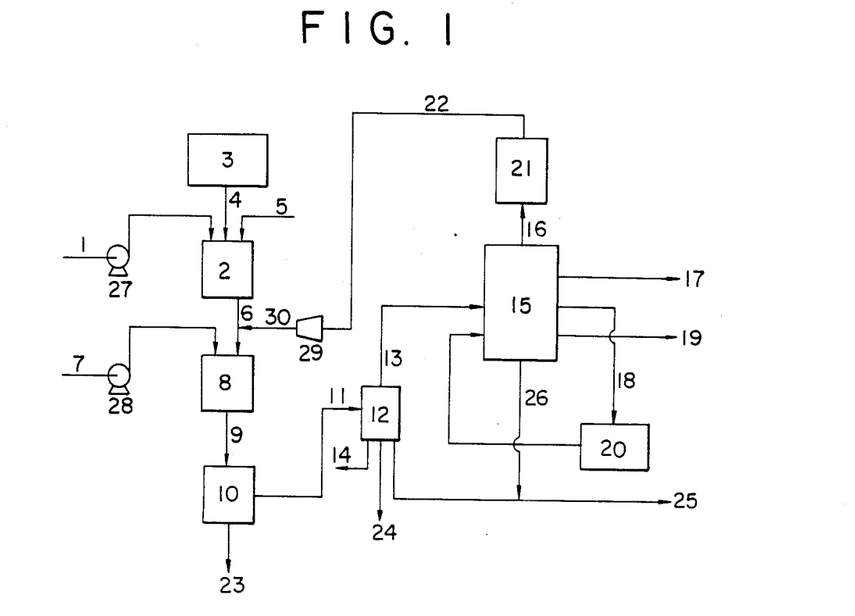
FIG. 1 is a flow chart showing a process embodying the present invention.

Reference is now made to the accompanying drawings and particularly FIG. 1 which shows an embodiment of the thermal cracking process of the invention. In the figure, a fuel hydrocarbon 1 is pressurized to a predetermined level by means of a fuel hydrocarbon feed pump 27 and fed to a combustor 2. To the combustor 2 are also fed oxygen 4 from an oxygen generator 3 and preheated steam from a line 5. In the combustor 2, the fuel hydrocarbon 1 is partially oxidized in the presence of the steam to generate a hot or high temperature combustion gas stream 6 of from 1400° to 3000° C. comprising hydrogen. The steam may be fed singly or in admixture with oxygen or a fuel. In order to protect the walls of the combustor, the steam may be fed along the walls. The hot fuel gas stream 6 comprising hydrogen and steam which is discharged from the combustor 2 is then mixed with recycle methane and hydrogen fed from a line 29 and fed into a reactor 8. The methane and hydrogen may be fed separately or in admixture. To the reactor 8 is fed a starting hydrocarbon 7 which has been pressurized to a predetermined level by a feed pump 28. The starting hydrocarbon 7 is brought to contact with the hot fuel gas stream 6 comprising methane, hydrogen and steam and is quickly heated by the hot gas. As a result, the thermal cracking reaction takes place in the reactor 8 under the action of the hydrogen, methane and steam as described before, thereby producing a reaction effluent 9 comprising a major proportion of olefins. Subsequently, the reaction effluent is immediately introduced into a quenching unit 10 and quenched. The quenching unit 10 may be, for example, a direct quencher in which water or oil is directly sprayed against the reaction effluent, or an indirect quenching heat exchanger in which two fluids are passed through the inside and outside of a tube and heat exchanged. Both devices may be used in combination. Immediately after the quenching, a non-cracked residue 23 is withdrawn for use as a heat source of a boiler or the like. After the quenching, the reaction effluent 11 is fed to a high temperature separation system 12 including a gasoline fractionator, a quenching tower, and an oil-water separator in which it is separated into a cracked gas 13, a fuel oil 24, a process water 14 and a cracked gasoline 25 containing BTX. On the other hand, the cracked gas 13 is introduced through separation and purification of acidic gases such as $CO_2$, $H_2S$ and the like into a product separation and purification unit 15. In the unit 15, the cracked gas 15 is separated into a mixed gas 16 of hydrogen, carbon monoxide and/or methane, an olefin 17 such as ethylene, propylene or the like, a paraffin 18 such as ethane, propane or the like, a C$_4$ component 19, and C$_{5+}$ components 26. The production separation and purification unit 15 may be operated by a combination of an ordinary low temperature gas separation process, an absorption process in which hydrogen and carbon monoxide (and in some cases, methane) are separated from C$_1$ or higher components, and a membrane separation process. The paraffin components 18 such as ethane, propane and the like are introduced into a steam cracking section 20 and recovered as ethylene, propylene and the like. On the other hand, the carbon monoxide contained in the mixed gas 16 comprising hydrogen, carbon monoxide and methane is shifted to hydrogen in a shift convertor 21, followed by passing through a line 22 and after raising the pressure in a compressor 29, if necessary, recycling for reaction by passing through a line 30. The starting hydrocarbons which may be thermally cracked according to the process of the invention include a wide variety of hydrocarbons covering from light hydrocarbons such as light such as naphtha heavy hydrocarbons such as asphalt, shale oil, bitumen, coal-liquefied oil, and in some case, solid slurrys and solid hydrocarbonaceous substances. It is important to note that according to the present invention, any hydrocarbons including light to heavy hydrocarbons may be converted into olefins in high yields and high selectivity by proper combination of hydrogen, methane and steam and proper control of operating conditions.

The fuel hydrocarbons may be either of the aboveindicated starting hydrocarbons (it is unnecessary that hydrocarbons used as the fuel and the starting material are the same). Alternatively, cracked oils obtained from thermal cracking processes of coal, non-cracked residual oils, and light gases from the separation and purification system from which hydrogen and methane necessary for the reaction are removed may also be used without any limitation on the selection thereof.

The effects inherent to the thermal cracking process of the invention are described.

The thermal cracking process of the invention have a number of advantages over prior art processes or techniques. Once again, the process of the invention is characterized in that hydrocarbons are burnt with oxygen in amounts less than the theoretical in the presence of steam to generate a hot atmosphere having a sufficient quantity of heat for the thermal cracking reaction of hydrocarbons to produce olefine and make-up hydrogen for the reaction. Furthermore, methane and hydrogen obtained from a product separation and purification system are recycled to a portion located upstream of a reactor for feeding to the hot atmosphere. By this, it becomes possible to cause predetermined amounts of methane, hydrogen and steam to selectively and intentionally be present in the reaction atmosphere prior to the reaction. The above fact brings about the following good effects.

<1> In a certain range of the partial pressure of hydrogen (or partial pressure of methane) which is necessary and favorable for producing olefins in high yields from starting hydrocarbons in the presence of steam, undesirable paraffination of olefins by hydrogen is suppressed by the action of methane. Additionally, hydrogen itself has the useful function of promoting the gasification. As a result, it becomes possible to produce useful components such as olefins from a wide variety of starting hydrocarbons including light hydrocarbons and heavy hydrocarbon such as asphalt in much higher yields than in the case of prior art processes. For instance, according to prior art processes, starting asphalt may be converted to olefins in a yield of about 25%. In contrast, the yield of olefins is as high as about 45% according to the present invention.

<2> In order to enhance the selectivity to ethylene (a ratio of ethylene to all olefins), a high partial pressure of hydrogen within the above-mentioned favorable range of the partial pressure of hydrogen should be used. In order that the selectivity to butadiene is increased, a low partial pressure of hydrogen within the range should be used. The selectivity to any desired product may thus be controlled.

<3> Heavy hydrocarbon materials have higher contents of polycyclic aromatic hydrocarbons, which are difficult to thermally crack, than light hydrocarbon materials. This needs to keep the partial pressure of hydrogen at a relatively high level in order to ensure a desired gasification rate (i.e. a ratio of the weight of a starting hydrocarbon fed to the reactor from which the weight of noncracked hydrocarbon is subtracted to the weight of the starting hydrocarbon feed). In addition thereto, the selectivity to products may be further controlled by properly controlling the partial pressure of hydrogen as discussed in item <2>.

<4> The process of the invention can conveniently make up hydrogen which is chemically consumed by the thermal cracking reaction and prevent the loss by oxidation of recycle hydrogen and methane to be fed to the reactor and useful components such as olefins in the reactor by means of an excess of unreacted oxygen. For this purpose, a fuel of low grade such as asphalt is partially oxidized with less than the theoretical amount of oxygen in the presence of steam to generate a high temperature reformed gas comprising hydrogen and steam. This reformed gas may be used, as it is, as hydrogen for subsequent reaction without cooling, separation and purification of hydrogen, and reheating or preheating. Accordingly, neither additional heat energy nor energy for separation and purification is necessary.

<5> Hydrogen and methane obtained in the separation and purification system are recycled to the reactor. The hydrogen serves to promote gasification of cracked materials and suppress coking. The methane is used for conversion into useful components such as olefins and suppression of paraffination of olefins. By properly controlling operating conditions of the process of the invention, the amount of secondarily produced methane can be controlled within a range of from zero to an amount sufficient to ensure a predetermined methane/hydrogen ratio necessary for the reaction. It will be noted that in prior art processes, methane is invariably produced (e.g. in a yield of about 10%). The thus produced methane is used as a fuel for thermal cracking along with secondarily produced hydrogen.

<6> Hydrocarbons are thermally cracked in the presence of steam, methane and hydrogen and thus coking can be suppressed more effectively than in the case of prior art processes.

<7> By the coexistence of methane, paraffination of olefins by hydrogenation can be suppressed, leading to good results of the reaction process in the sense that while olefins increase in amounts, a consumption of valuable hydrogen decreases proportionally.

<8> Since no generation of heat occurs accompanied by hydrogenation of olefins, it is possible to obtain a gently varying yield distribution in relation to variation in reaction temperature, residence time or quenching time. This is vary advantageous in improving controllability and operability of the system.

<9> With heavy hydrocarbons, atomization of oil droplets is important in order to attain high gasification rate, improve yields of useful components and suppress coking. One of methods for realizing the atomization is that the hot or high temperature gas is used in large amounts in relation to starting hydrocarbon whereby the shearing effect of the gas on the starting oil droplets is increased. In the practice of the invention, steam is used as is different from prior art processes which make use of hydrogen and inert gases such as nitrogen and carbon dioxide. Since the steam is readily recovered by cooling, atomization of oil droplets can be effected without involving any burden on the purification system.

<10> Since burning is effected in the presence of steam, the burning or combustion temperature is lowered with the possibility of suppressing coking and sooting. This permits use of heavy hydrocarbons such a asphalt as a fuel.

<11> Hydrocarbons are burnt in a high concentration of oxygen and little inert gas is contained in the hot atmosphere. Only a reduced burden is imposed on the separation and purification system.

<12> The operation is carried out under pressure, so that a pressurizing energy for the cracked gas necessary for the purification can be reduced considerably.

In short, according to the present invention, desired olefin products can be selectively obtained from arbitrary hydrocarbon starting material in high heat efficiency and in high yield without involving coking.

The thermal cracking process of the invention are described in more detail by way of example, which should not be construed as limiting the present invention thereto.

EXAMPLE

In this example, a vacuum residue of middle cast petroleum having a specific density of 1.02, a sulfur content of 4.3% and a pour point of 40° C. was used as a starting hydrocarbon material and a fuel.

The vacuum residue was partially oxidized with oxygen in a combustor located above a reactor while blowing, from all direction, steam preheated to 500° C., thereby generating a hot or high temperature gas comprising hydrogen and steam. The oxygen used was highly concentrated oxygen obtained by the low temperature gas separation process of air. Downstream of the combustor, a mixed gas of hydrogen and methane of a normal temperature was blown into the top of a reactor and mixed with the hot gas. Thereafter, the vacuum residue was sprayed for thermal cracking into the gas mixture from a plurality of asphalt burners provided at inner side walls of the reactor. The resulting product was quenched by directly injecting water from a cooler provided in direct combination with the reactor at the lower portion thereof and was analytically determined. The residence time was determined by calculation of the capacity of the reactor and the reaction conditions.

Naphtha (boiling point: 40° C.–180° C.) was also thermally cracked using the same apparatus in the same manner as described above and the resulting product was determined. The steam/fuel ratio on the weight basis was changed in the respective tests within a range of about 0.5 to 30 in order to obtain predetermined reaction conditions.

Figure 2:
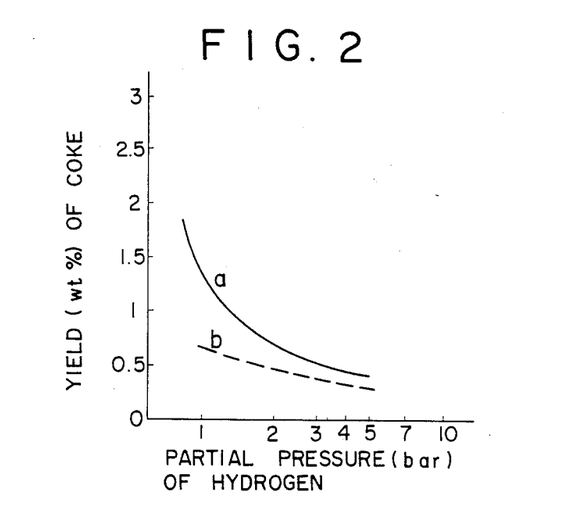
FIG. 2 is a graph showing the relation between the yield of coke and the partial pressure of hydrogen.

FIG. 2 is a graph showing the relation between the partial pressure of hydrogen and the yield of coke in case where the vacuum residue from a middle east petroleum and naphtha were each thermally cracked under conditions of a reactor outlet temperature of 1000° to 1020° C., a $CH_4/H_2$ molar ratio of 0.5, a total pressure of 30 bars and a residence time of 20 milliseconds. In the figure, indicated by a is a curve of the yield of coke where the vacuum residue from middle east petroleum was thermally cracked and by b is a curve of the yield of coke where naphtha was thermally cracked. As will be clearly seen from FIG. 2, the increase of the partial pressure of hydrogen results in a drastic decrease in amount of coke. When the partial pressure of hydrogen is kept at a level over 1.5 bars, inclusive, the yield of coke can be suppressed in a very low degree even with heavy hydrocarbons such as the vacuum residue. In FIG. 2, the yield of coke is also shown in case where naphtha is used as a light hydrocarbon for comparison with the heavy hydrocarbon. In this case, the formation of coke is suppressed at a high partial pressure of hydrogen. The effect of the hydrogen partial pressure is greater than the effect on the heavy hydrocarbon.

Figure 3:
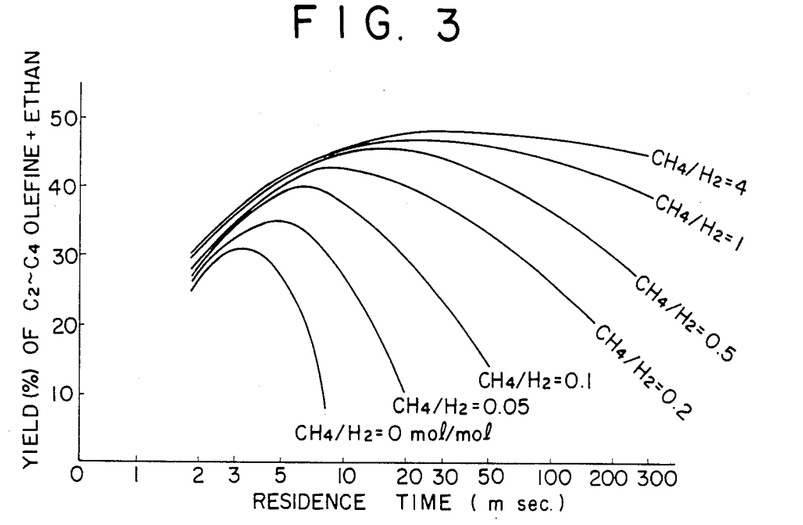
FIG. 3 is a graph showing the relation between the yield of $C_2$–$C_4$ olefins and ethane and the residence time for different methane/hydrogen molar ratios.

FIG. 3 is a graph showing the relation between the total yield of $C_2$–$C_4$ olefins and ethane and the residence time for different $CH_4/H_2$ molar ratios in case where the vacuum residue from a middle east petroleum is thermally cracked under conditions of a total pressure of 30 bars and a reactor outlet temperature of 1000° C. to 1030° C. The reason why the yield of ethane is evaluated by addition to the yield of $C_2$–$C_4$ olefins is that the amount of ethane is relatively large and ethane can be simply converted into ethylene. As will be clear from FIG. 3, an increased ratio of methane results in an increase of the total yield of the $C_2$–$C_4$ olefins and ethane. Further, the variation of the yield in relation to the residence time becomes small with the distribution of the yield being stabilized. The ratio of the $C_3$–$C_4$ olefins to the total of the $C_2$–$C_4$ olefins and ethane (the yield of ethane is from 5 to 10%), i.e. ($C_3$ and $C_4$ olefins)/($C_2$–$C_4$ olefins and ethane), is larger in a higher ratio of ethane. When the $CH_4/H_2$ molar ratio is 1, the ratio is from 10 to 40% though such a ratio becomes smaller for a longer residence time. These results demonstrate that the addition of $CH_4$ leads to a high yield of olefins as compared with the case where no $CH_4$ is added, i.e. $CH_4/H_2=0$. The variation of the yield relative to the residence time is remarkably improved. This effect of $CH_4$ is shown even in a $CH_4/H_2$ molar ratio of 0.05 and is more pronounced when the molar ratio is over 0.1. The residence time may be selected from a wide range of from 5 to 300 milliseconds.

Figure 4:
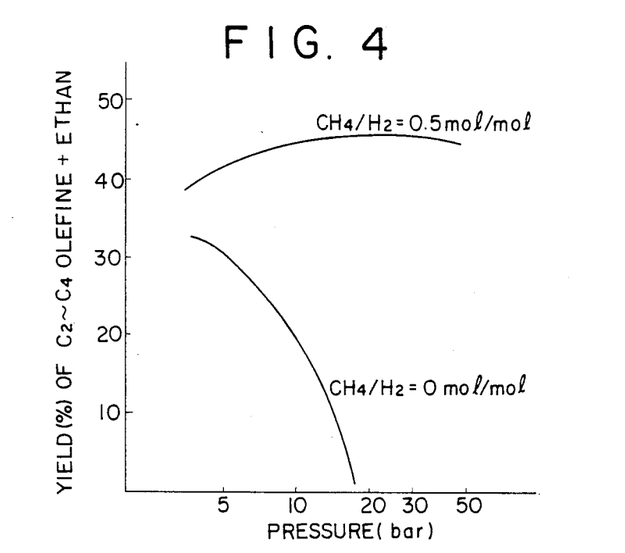
FIG. 4 is a graph showing the relation between the yield of $C_2$–$C_4$ olefins and ethane and the reaction pressure for different methane/hydrogen molar ratios.

FIG. 4 is a graph showing the relation between the pressure and the total yield of $C_2$-$C_4$ olefins and ethane in case where the vacuum residue from a middle east petroleum was thermally cracked under conditions of a reactor outlet temperature of from 1000° to 1020° C., a residence time of 20 milliseconds and a $CH_4/H_2$ molar ratio of 0 or 0.5. The results of FIG. 4 reveal that the influence of the pressure on the total yield of the $C_2$-$C_4$ olefins and ethane is almost negligible when the $CH_4/H_2$ molar ratio is 0.5. In contrast, with the system using no $C_4$, an increased pressure causes the $C_2$-$C_4$ olefins and ethane to be abruptly methanated by hydrogenation or decomposition, thus considerably lowering the yield of the $C_2$-$C_4$ olefins and ethane.

Figure 5:
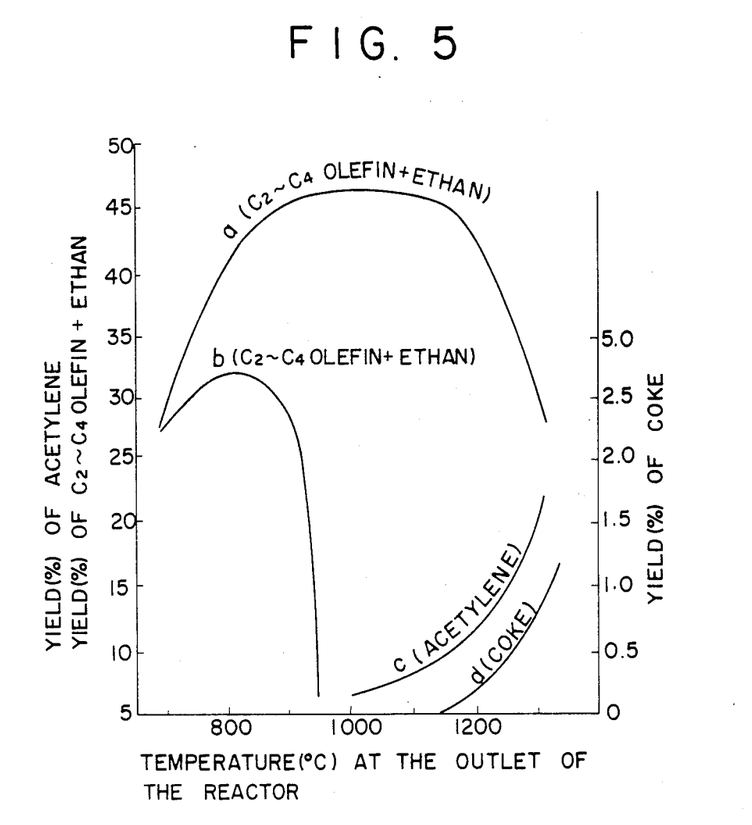
FIG. 5 is a graph showing the relation between the yield of products and the temperature at the outlet of a reactor.

FIG. 5 is a graph showing the relation between the total yield of $C_2$-$C_4$ olefins and ethane or yield of coke and the outlet temperature of the reactor in case where the vacuum residue from a middle east petroleum was thermally cracked under conditions of a total pressure of 30 bars, a residence time of 20 milliseconds and a $CH_4/H_2$ molar ratio of 0 or 0.5. In the figure, indicated by a is a curve illustrating the relation between the total yield of the $C_2$-$C_4$ olefins and ethane and the outlet temperature for a $CH_4/H_2$ molar ratio of 0.5; by b is a curve showing the relation between the total yield of the $C_2$-$C_4$ olefins and ethane and the outlet temperature for a $CH_4/H_2$ molar ratio of 0; by c is a curve illustrating the relation between the yield of acetylene and the outlet temperature for a $CH_4/H_2$ molar ratio of 0.5; and by d is a curve showing the relation between the yield of coke and the outlet temperature. As will be seen from the figure, when the $CH_4/H_2$ molar ratio is 0.5 and the outlet temperature is from 800° to 1200° C., the yield of the $C_2$-$C_4$ olefins and ethane is as high as over 40%. However, at temperatures lower than 800° C. the reaction speed is drastically lowered, with the result that the total yield of the $C_2$-$C_4$ olefins and ethane is also considerably lowered. On the other hand, at high temperatures, acetylene is formed by dehydrogenation of ethylene and decomposition of methane. The formation becomes more pronounced at temperatures over 1200° C. and thus the yield of the $C_2$-$C_4$ olefins and ethane sharply lowers. As a result, an amount of coke which is considered to result from the polycondensation of acetylene increases. Only for comparison purpose, the process using a $CH_4/H_2$ molar ratio of 0 or no methane is carried out as described above. In this case, drastic hydrogenation of the $C_2$-$C_4$ olefins and ethane proceeds with an increase of temperature, thus lowering the yield of the components considerably.

Figure 6:
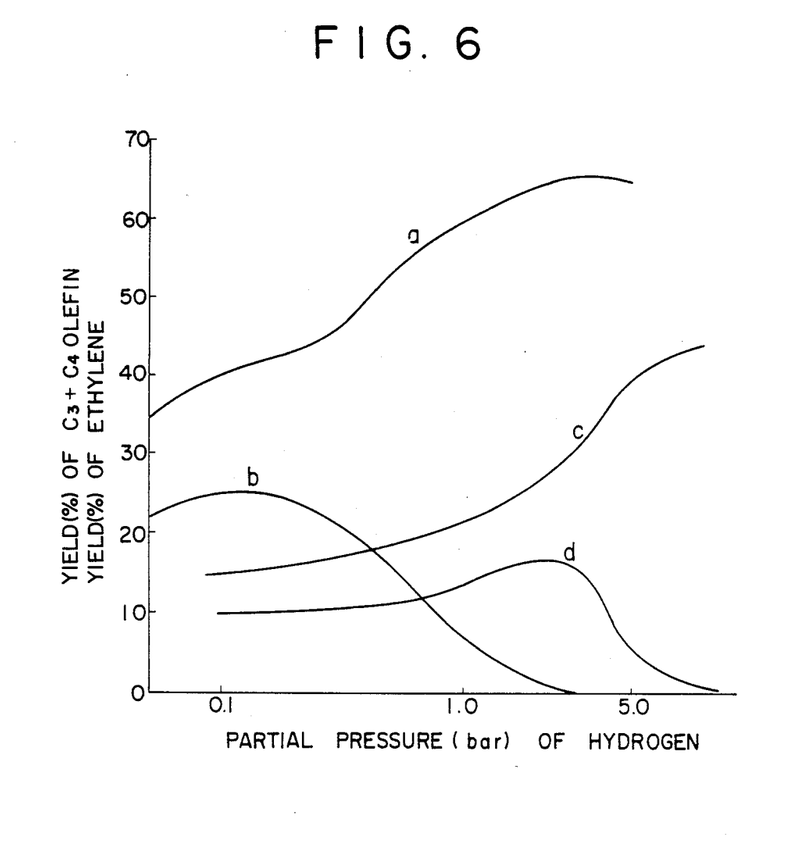
FIG. 6 is a graph showing the relation between the yield of ethylene and $C_3$ and $C_4$ olefins and the partial pressure of hydrogen.

FIG. 6 is a graph showing the relation between the yield of ethylene or $C_3$ and $C_4$ olefins and the partial pressure of hydrogen at the outlet of the reactor in case where the vacuum residue and naphtha were each thermally cracked under conditions of a reactor outlet temperature of from 1000° to 1020° C., a total pressure of 10 bars, a residence time of 15 milliseconds and a $CH_4/H_2$ molar ratio of 0.5. In the figure, indicated by a is a curve showing the relation between the yield of ethylene and the partial pressure of hydrogen for thermal cracking of naphtha; indicated by b is a curve showing the relation between the yield of $C_3$ and $C_4$ olefins and the partial pressure of hydrogen for thermal cracking of naphtha; by c is a curve showing the relation between the yield of ethylene and the partial pressure of hydrogen for thermal cracking the vacuum residue from middle east petroleum; and by d is a curve showing the relation between the total yield of $C_3$ and $C_4$ olefins and the partial pressure of hydrogen for thermal cracking of the vacuum residue. As will be clearly seen from the figure, with the thermal cracking of naphtha, the yield of ethylene increases with an increase of the partial pressure of hydrogen. However, the yield of the $C_3$ and $C_4$ olefins initially increases with an increase of the hydrogen partial pressure but a further increase of the partial pressure causes propylene and butadiene to be decomposed into ethylene and methane with a decrease in yield of these olefins. The yield of ethylene further increases due to the decomposition of these $C_3$ and $C_4$ olefins. The thermal cracking of the vacuum residue from middle east petroleum is fundamentally similar to the case of the thermal cracking of naphtha with regard to the influence of the partial pressure of hydrogen. More particularly, while the yield of ethylene increases with an increase of the partial pressure, the yield of the $C_3$ and $C_4$ olefins initially increases with an increase of the partial pressure and then decreases by decomposition into ethylene and methane when the partial pressure is further increased.

The thermal cracking of naphtha and the vacuum residue shows a similar tendency of the variation in yield of ethylene and yield of the $C_3$ and $C_4$ olefins in relation to an increase of the partial pressure of hydrogen. The level of the partial pressure of hydrogen which brings about the variation of these yields depends on the type of starting hydrocarbon. In order to obtain a high yield of olefins, the partial pressure of hydrogen is 0.1 bar or more for naphtha and 1.5 bars or more for the vacuum residue. Moreover, it will be found that the ratio of a yield of ethylene or a yield of the $C_3$ and $C_4$ olefins to the total yield of products can be suitably controlled by varying the partial pressure of hydrogen. It will also be found that propylene and butadiene olefins are obtained in a high total yield when the hydrogen content in the hot gas mixture of hydrogen, methane and steam prior to mixing with starting hydrocarbons is below 30 mole % (corresponding to a partial pressure of hydrogen below about 3 bars) for heavy hydrocarbons used as a starting hydrocarbon. When light hydrocarbon are used as a starting hydrocarbon, the hydrogen content is below 10 mole % (corresponding to a partial pressure of hydrogen below about 0.8 bar).

In Table 1, there are shown reaction conditions and results of complete combustion of a hydrocarbon fuel with oxygen as Comparative Example and partial combustion of the fuel with oxygen used in an amount less than the theoretical as Example of the invention. In the example, the amount of oxygen was changed so that amounts of hydrogen and methane in the reaction atmosphere were almost at the same levels as in Comparative Example. The feed of hydrogen to the reactor was reduced by an amount corresponding to an amount of hydrogen generated by the partial combustion. As a result, yields of various components other than carbon monoxide were similar to those of Comparative Example. From this, it will be seen that carbon monoxide is secondarily produced by the partial combustion and high yields of olefins are obtained similar to the case of the complete combustion even under conditions where the carbon monoxide is present in the reaction system.

The generated carbon monoxide may be converted to hydrogen in an amount of 0.01 kg per kg of starting carbon monoxide according to the shift reaction. By the addition of the coverted hydrogen to unreacted hydrogen at the outlet of the reactor, a sufficient amount of hydrogen for feed to the reactor can be easily obtained.

From the above, it will be understood that a steam reformer such as for methane by-product and a hydrogen separation and purification system which are ordinarily separately installed for make-up purposes are not required at all.

TABLE 1

|  | Comp. Ex. | Ex. |
|---|---|---|
| *Feed (kg/kg of starting oil) | | |
| (1) Vacuum residue of middle east petroleum (for fuel) | 0.188 | 0.265 |
| (2) Oxygen | 0.599 | 0.618 |
| (3) Steam | 1.589 | 1.712 |
| (4) Methane | 0.141 | 0.141 |
| (5) Hydrogen | 0.101 | 0.083 |
| *Cracking conditions | | |
| (1) Pressure (kg/cm$^2$G) | 10 | 10 |
| (2) Residence time (msec.) | 15 | 15 |
| *Gas flow rate at the outlet (kg/kg of starting oil) | | |
| (1) H$_2$ | 0.075 | 0.074 |
| (2) H$_2$S | 0.039 | 0.042 |
| (3) CH$_4$ | 0.334 | 0.322 |
| (4) C$_2$H$_2$ | 0.018 | 0.017 |
| (5) C$_2$H$_4$ | 0.208 | 0.212 |
| (6) C$_2$H$_6$ | 0.064 | 0.066 |
| (7) C$_3$'S | 0.114 | 0.117 |
| (8) C$_4$'S | 0.045 | 0.047 |
| (9) BTX | 0.046 | 0.045 |
| (10) Cracked residue | 0.308 | 0.313 |
| (11) CO | 0 | 0.142 |
| (12) CO$_2$ | 0.583 | 0.593 |

From the results of the example, the ranges of the reaction conditions effective in the practice of the invention are as follows.

The partial pressure of hydrogen depends on the type of starting hydrocarbon. Higher partial pressures are preferably used for heavier hydrocarbons. With light hydrocarbons such as naphtha, the partial pressure should preferably be 0.1 bar or more. In the case of heavy hydrocarbons such as various residues, shale oil, bitumen, tar, coal liquefied oil, cracked residues, petroleum coke and the like, it should preferably be 1.5 bars or more.

With regard to the ratio of methane, a CH$_4$/H$_2$ molar ratio less than 0.05 is not effective and is preferably not less than 0.1. On the other hand, an increase of the ratio of methane brings about an increase in quantity of heat necessary for heating up to reaction temperature, resulting in an increase of energy cost. At a CH$_4$/H$_2$ molar ratio larger than 4, its contribution to an increase of the yield of olefins is very small, so that the molar ratio should preferably not larger than 4.

In order to obtain a high yield of olefins, the residence time is generally from 5 to 300 milliseconds, preferably from 10 to 100 milliseconds. The reaction time is generally from 800° to 1200° C.

What is claimed is:

1. A thermal cracking process for producing olefins from hydrocarbons which comprises the steps of partially burning a hydrocarbon with less than the theoretical amount of oxygen in the presence of steam to give a hot gas of from 1400° to 3000° C. comprising steam and hydrogen; feeding to the hot gas comprising steam and hydrogen, a mixture of methane and hydrogen so that the methane/hydrogen molar ratio in the hot gas is about 0.05; further feeding a starting hydrocarbon to the hot gas mixture comprising the methane, hydrogen and steam; subjecting the starting hydrocarbon to thermal cracking while keeping the partial pressure of hydrogen at least 0.1 bar at the outlet of a reactor, the temperature at 800° to 1200° C., and the residence time at 5 to 300 milliseconds; and quenching the resulting reaction product.

2. The thermal cracking process according to claim 1, wherein the first-mentioned hydrocarbon is partially burnt in the presence of steam, in a ratio of steam to the hydrocarbon of from 0.5 to 30 on the weight basis.

3. The thermal cracking process according to claim 1, wherein the CH$_4$/H$_2$ molar ratio in the hot gas is from 0.05 to 4.0.

4. The thermal cracking process according to claim 1, wherein the partial pressure of hydrogen is not less than 0.1 bar when the starting hydrocarbon is a light hydrocarbon.

5. The thermal cracking process according to claim 1, wherein the partial pressure of hydrogen is not less than 1.5 bars when the starting hydrocarbon is a heavy hydrocarbon.

6. The thermal cracking process according to claim 1, wherein the residence time is from 10 to 100 milliseconds.

* * * * *

UNITED STATES PATENT AND TRADEMARK OFFICE
CERTIFICATE OF CORRECTION

PATENT NO. : 4,599,479

DATED : July 8, 1986

INVENTOR(S) : Toshiro Okamoto, Michio Ohshima

It is certified that error appears in the above—identified patent and that said Letters Patent is hereby corrected as shown below:

Col. 16, line 35, change "about 0.05" to --not less than 0.05--

Signed and Sealed this

Twenty-sixth Day of January, 1988

*Attest:*

DONALD J. QUIGG

*Attesting Officer*   *Commissioner of Patents and Trademarks*